Figure 1:
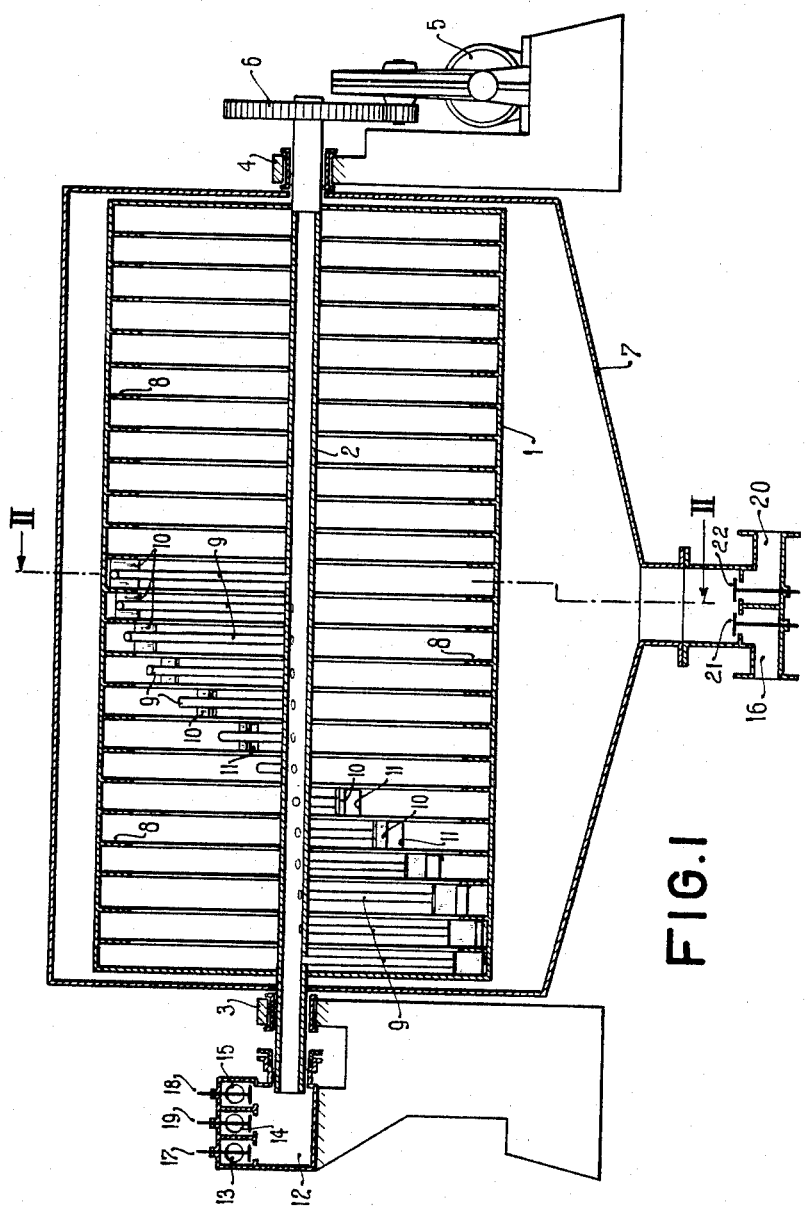

Aug. 2, 1955  E. P. ROELOFS  2,714,486
APPARATUS FOR THE PURIFICATION OF STARCH SUSPENSIONS
Filed Sept. 29, 1952  2 Sheets-Sheet 1

Inventor
Elerus P. Roelofs
By E. J. Freeman
Attorney

United States Patent Office 2,714,486
Patented Aug. 2, 1955

2,714,486

APPARATUS FOR THE PURIFICATION OF STARCH SUSPENSIONS

Elerus P. Roelofs, Gasselternijveen, Netherlands

Application September 29, 1952, Serial No. 312,070

3 Claims. (Cl. 233—29)

This invention relates to an apparatus for the purification of starch suspensions, such as are obtained when recovering starch from starch containing tubers, roots, bulbs and corn. After comminuting the raw material the starch is washed out from the comminuted mass by means of water so that a starch suspension is obtained containing as solid impurities so called dark meal, fibres of cellulose, flocculated albumen, sand, etc.

The separation of said impurities and of the fruit-liquor from the raw starch suspension was carried out up to now on settling tables, on which the pure starch is precipitated and from which the water flows off together with the light impurities. Said settling tables require a large space as for the precipitation of the starch the suspension has to follow a long path and its rate of flow should be relatively small so that a large number of settling troughs should be placed side by side. Moreover the tabling process is a long lasting operation, whereby the oxygen from the air has an opportunity to act upon the starch and said latter runs the risk of acidification.

For the purification of starch also centrifugal machines having an imperforated bowl, so called separators are used. In such a machine the light impurities are accumulated in the inner layer on the wall of the bowl so that said layer can be scraped off and be removed separately for further purification. Said purification, however, requires settling tables.

The invention has for its object to obtain a compact apparatus for the purification of raw starch suspensions.

To this end a rotary drum is provided into which one or more supply tubes open near the circumferential wall and a partition extending inwards substantially parallel to the axis of the drum and being secured to the wall of the drum in front of the mouth of the supply tube with respect to the direction of rotation of the drum and a discharge opening being provided in the circumferential wall of the drum in front of said partition with respect to the direction of the drum rotation. The mass flowing out the supply tube is subjected to centrifugal action and if now the centrifugal force is chosen in a proper relation to the rate of flow of the mass a similar action as when settling on normal tables may be obtained. The flow of the liquid causes a propelling action which results in the desired separation of the impurities. Due to the friction encountered by the flow at the surface of the circumferential wall of the drum and at the surface of the precipitated layer of starch the velocity of the flowing liquid will decrease towards the wall of the drum so that the mass has its smallest velocity at the wall of the drum. As the starch granules are relatively heavier than the impurities mainly consisting of fibre particles the starch granules on account of said smaller velocity of flow will be in a position to settle on the wall of the drum. Since the light fibre particles have a relatively larger surface than the starch granules they are subjected to a stronger propelling action by the flow so that said particles are entrained with the flow of liquid and do not have an opportunity to settle on the wall of the drum under the action of the centrifugal force as the starch granules do. The impurities, therefore, are carried away by the fruit liquor and are removed through the discharge opening provided in the wall of the drum.

The layer of starch precipitated on the wall of the drum may be removed by scraping or washing with water or with a purified starch suspension.

The apparatus according to the invention is not only adapted for separating the impurities from starch but also for separating starch in two fractions of different granule-size.

Preferably a relatively long drum is used and divided into a plurality of troughs by annular partitions secured to the circumferential wall of the drum, a partition extending inwards substantially parallel to the axis of the drum being arranged in each trough in front of the mouth of the supply tube and a discharge opening being provided in the wall of the drum in front of each of said partitions.

Figure 2:
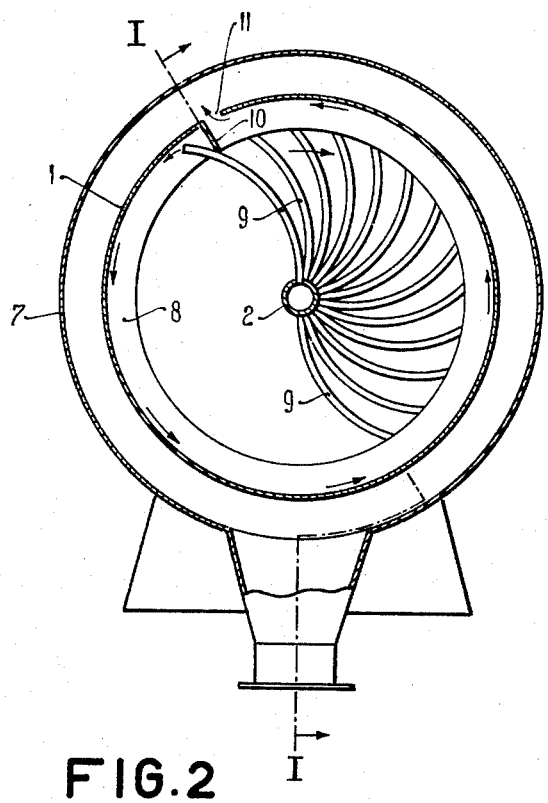

The invention will further be described with reference to the accompany drawing, Fig. 1 of which shows a sectional elevation of the drum. Fig. 2 is a cross section along the line II—II of Fig. 1.

The hollow shaft 2 of the drum 1 is supported in bearings 3, 4 and is driven by a motor 5 through the intermediary of a gear 6. The drum 1 which is enclosed by a stationary casing 7 has in its interior ring-shaped partitions 8 so that annular troughs are formed in each of which a tube 9 secured to shaft 2 opens. In front of the mouth of each tube 9 a radially directed partition 10 is provided in the respective trough and in front of said partition a discharge opening 11 is provided in the wall of the drum. As the layer of starch in each trough has its greatest thickness at the mouth of the tube 9 the succeeding tubes are arranged in vertically staggered relation in circumferential and axial direction so that the balancing of the drum is not affected by the decreasing thickness of the layers of starch towards the discharge openings in the drum wall.

The shaft 2 of the drum opens into a chest 12 to which at 13 a conduit for the raw starch suspension, at 14 a conduit for supplying flushing liquid and at 15 a conduit for supplying washing water are connected. The starch suspension is pre-concentrated to about 4° Bé. before being supplied to the drum.

The protein-water leaving the drum through the discharge openings 11 and entraining the impurities is received in the casing 7 and discharged through the outlet 16 by the intermediary of valve 21. When the troughs formed between the annular partitions 8 are filled with starch the inlet valve 17 is closed and the valve 18 for supplying washing water is opened, so that the impurities left behind on the layer of starch are washed off therefrom. Thereupon valve 19 for supplying flushing liquid is opened after valves 18 and 21 have been closed and valve 22 is opened so that the starch settled between the partitions is flushed away and leaves the casing at 20.

It is to be noted that the centrifugal force required for separating the starch is obtained at a relatively small number of revolutions of the drum. For a drum having a diameter of 7 ft. the number of revolutions will be about 300 per min.

Though in the drawing a drum having a horizontal shaft is illustrated the drum may also be mounted vertically. The partitions 8 may be arranged helically with a small pitch.

What I claim is:

1. An apparatus for the purification of starch suspensions, comprising a rotary drum, a plurality of ring-shaped partitions secured to the circumferential wall of said drum, at least one supply tube opening near the circumferential wall of the drum, a partition extending inwards substantially parallel to the axis of the drum and being secured to the wall of the drum in front of the mouth of the supply tube with respect to the direction of rotation of the drum and a discharge opening being provided in the circumferential wall of the drum in front of said partition with respect to the direction of the drum rotation.

2. An apparatus for the purification of starch suspensions, comprising a rotary drum, a plurality of ring-shaped partitions secured to the circumferential wall of the drum and forming annular troughs, a supply conduit opening in each of said troughs, a partition in each trough, said partition extending inwards substantially parallel to the axis of the drum and being placed in front of the mouth of the supply tube, and a discharge opening being provided in the wall of the drum in front of each of said partitions with regard to the direction of the drum rotation.

3. An apparatus for the purification of starch suspensions, comprising a rotary drum and a plurality of ring-shaped partitions secured to the circumferential wall of the drum and forming annular troughs, a supply conduit opening in each of said troughs, a partition in each trough, said partition extending inwards substantially parallel to the axis of the drum and being placed in front of the mouth of the supply tube, said supply tubes being arranged with their mouths in helically staggered relation in circumferential and axial direction of the drum and a discharge opening being provided in the wall of the drum in front of each of said partitions with regard to the direction of the drum rotation.

References Cited in the file of this patent

UNITED STATES PATENTS

| Number | Name | Date |
| --- | --- | --- |
| 355,050 | Backstrom | Dec. 28, 1886 |
| 367,778 | Backstrom | Aug. 9, 1887 |
| 501,040 | Berrigan | July 4, 1893 |
| 2,184,598 | Jahn | Dec. 26, 1939 |
| 2,443,310 | Eckers | June 15, 1948 |

FOREIGN PATENTS

| Number | Country | Date |
| --- | --- | --- |
| 69,482 | Germany | July 5, 1893 |
| 204,835 | Switzerland | Aug. 16, 1939 |